United States Patent [19]

Larson

[11] 4,372,250
[45] Feb. 8, 1983

[54] MILKING INFLATION

[75] Inventor: Leigh R. Larson, Johnson Creek, Wis.

[73] Assignee: Hi-Life Rubber, Inc., Johnson Creek, Wis.

[21] Appl. No.: 280,454

[22] Filed: Jul. 16, 1981

[51] Int. Cl.³ .............................................. A01J 5/04
[52] U.S. Cl. .............................. 119/14.47; 119/14.49
[58] Field of Search ............... 119/14.47, 14.48, 14.49, 119/14.50, 14.51, 14.52, 14.53

[56] References Cited

U.S. PATENT DOCUMENTS

| | | | |
|---|---|---|---|
| 2,120,556 | 6/1938 | Greene | 119/14.49 |
| 2,744,496 | 5/1956 | Roben | 119/14.47 |
| 3,474,760 | 10/1969 | Siddall et al. | 119/14.49 |
| 4,141,319 | 2/1979 | Maier et al. | 119/14.47 |

Primary Examiner—Hugh R. Chamblee

Attorney, Agent, or Firm—Michael, Best & Friedrich

[57] ABSTRACT

The head end portion of a milking inflation adapted to fit over the upper end of a teat cup shell includes a peripheral cuff adapted to surround and sealingly engage the upper rim of the shell and a substantially flat, relatively thin web section extending radially inwardly from the cuff and terminating in a raised, rounded deed which defines a circular central opening or mouth for receiving a cows' teat. A plurality of circumferentially-extending ribs are formed integrally with and extend radially outwardly from the bead and also are formed integrally with and project axially outwardly from the exterior surface of the web section. These ribs add sufficient stiffness to the web section to substantially increase its tendency to resist inward and outward deflections from its original flat and horizontal position and to return the web section to its original position if deflected.

5 Claims, 3 Drawing Figures

MILKING INFLATION

BACKGROUND OF THE INVENTION

This invention relates to liners or inflations for teat cup assemblies of vacuum-operated milking machines and, more particularly, to such inflations including a head end which fits over the upper end of a teat cup shell and includes a central opening for receiving a cow's teat.

Automatic milking machines employ teat cup assemblies including a hollow, rigid outer shell which is attached to a pulsating vacuum line and a resilient, tubular liner or inflation installed in the shell in a manner to form a seal at both ends of the shell. A cow's teat is inserted in the upper end of the inflation and the lower end is connected to a so-called claw of the milking machine. During the milking operation, the teat cup assembly is suspended from a cow's teat, primarily by the engagement between an opening or mouth in the upper or head end of the inflation and the cow's teat and milk flows through the inflation under the influence of a vacuum maintained in the milking machine claw.

One type inflation has a head end including a downwardly extending cuff which fits snugly over the upper end of the shell and a generally horizontally extending end wall having a circular central opening for receiving a cow's teat. One problem with this type inflation is a tendency for the shape of the mouth to be distorted (out of round) at the time a teat is inserted and/or during the milking operation. A misshapen mouth permits undesirable amounts of air to enter the inflation during milking, resulting in excessive vacuum loss, slurping, inflation slippage or dropoff. This undesired distortion of the mouth can result from the end wall being deflected either inwardly or outwardly from its normal horizontal or flat position when a teat is inserted and/or during the milking operation. It also can result from the material surrounding the mouth being so elastic that the opening can be pushed sideways by a cow's teat.

Representative prior constructions for milking inflations known to applicant including features which might at least partially alleviate the above problem are disclosed in U.S. Pat. Nos. 3,659,557 (Noorlander), issued May 2, 1972; 3,696,790 (Albright) issued Oct. 10, 1972; 4,116,165 (Arrington) issued Sept. 26, 1978; and 4,141,319 (Maier et al.), issued Feb. 27, 1979.

The Noorlander patent discloses an expansion-ring type inflation with the teat-receiving portion including a plurality of longitudinally extending corrugations which cause a central opening having an unreinforced edge to be undulated. The Arrington patent also discloses an expansion-ring type inflation and the teat-receiving end portion includes a tapered wall and a bead surrounding a central opening. In expansion-ring type inflations, a substantial stretching of the material forming the teat-receiving portion by the expansion ring tends to keep the resulting diaphragm in a horizontal position.

FIGS. 13 and 16 of the Albright patent illustrate an inflation having a teat-receiving portion including a plurality of radially extending corrugations and a circumferentially extending corrugation which respectively spread and squeeze when a teat is inserted into a central opening having an unreinforced edge. FIGS. 4 and 5 of the Maier et al patent illustrate an inflation having a a plurality of radially extending ribs. These ribs serve to support the radial tension applied on the unreinforced edge of a central opening, but terminate short of the opening so that the front edge of the opening is particularly elastic and, therefore, subject to distortions.

SUMMARY OF THE INVENTION

One of the principal objects of the invention is to provide a milking inflation having a head end wall which has an improved capability of resisting inward and outward deflections from its original flat position and of returning to its original flat position if deflected.

Another of the principal objects of the invention is to provide a milking inflation having an improved capability for the teat-receiving opening to retain its original shape and size during use.

Other objects, aspects and advantages of the invention will become apparent to those skilled in the art upon reviewing the following detailed description, the drawing and the appended claim.

The milking inflation of the invention is made from a flexible or elastomeric material, such as a rubber composition, has a tubular body or suction sleeve and a head end portion adapted to fit over the upper edge of a teat cup shell. The head end portion includes a peripheral cuff adapted to surround and sealingly engage the upper rim of the shell, a substantially flat web section extending radially inwardly from the cuff substantially perpendicularly to the longitudinal axis of the tubular body and terminating in a raised, rounded bead which defines a circular central opening or mouth for receiving a cow's teat, and a plurality of circumferentially-extending ribs formed integrally with and extending radially outwardly from the bead and also formed integrally with and projecting axially outwardly from the exterior surface of the web section.

The bead reinforces the edge or lip of the mouth and assists the mouth in retaining its original shape and size during use. The web section is relatively thin, preferably has a uniform wall fitness, and thereby provides sufficient resilience to prevent the bead-reinforced mouth to be slipped onto teats of different sizes without injury. The ribs, which preferably extend substantially to the outer periphery of the cuff, adds sufficient stiffness to the web section to substantially increase its tendency to resist inward and outward deflections from its original flat and horizontal position and to return it to its original position if deflected.

DESCRIPTION OF THE PREFERRED EMBODIMENTS

Figure 1:
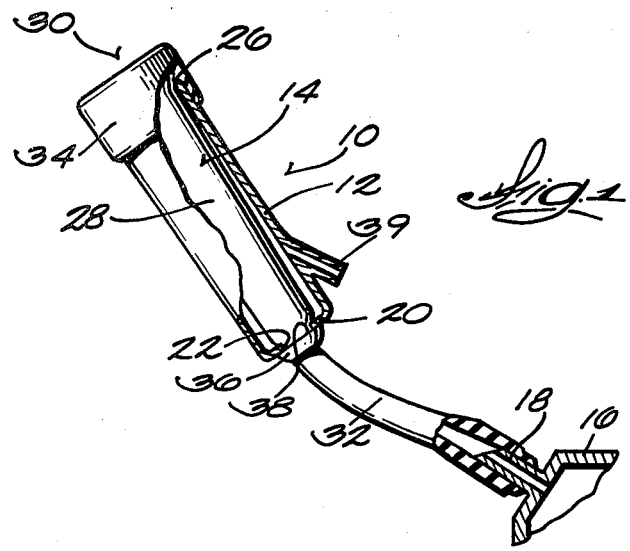
FIG. 1 is a partially sectioned, side elevation view of a teat cup assembly carrying an inflation of the invention, shown with the inflation connected to the nipple on a milker claw and the teat cup assembly in position for connection to a cow's teat.
Figure 2:
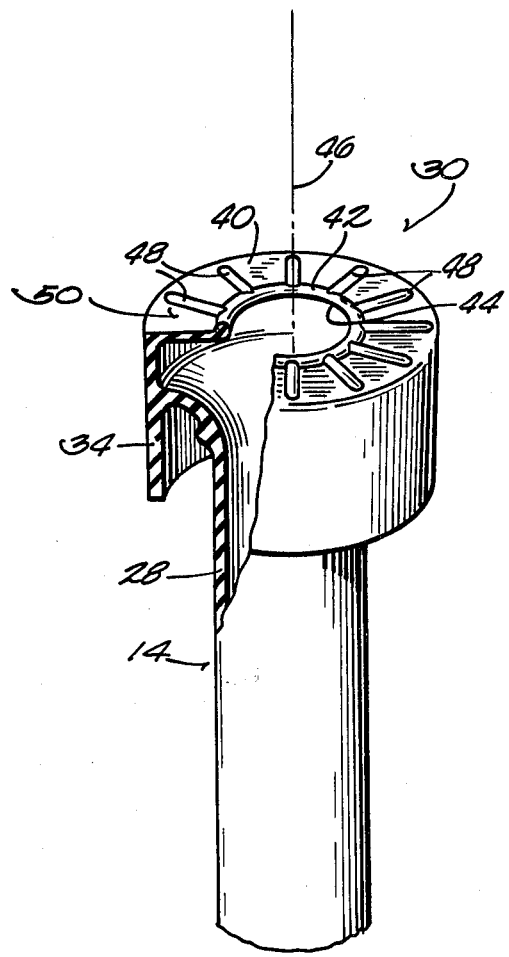
FIG. 2 is an enlarged, fragmentary and partially sectioned perspective view of the head end portion of a milking inflation embodying the invention.
Figure 3:
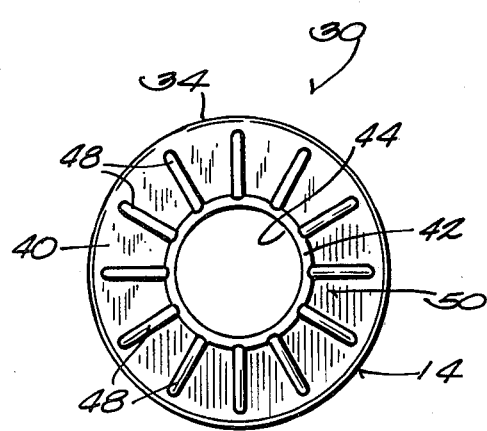
FIG. 3 is a top plan view of the head end of the inflation of FIG. 2.

Illustrated in FIG. 1 is a teat cup assembly 10 including a rigid, generally cylindrical outer shell 12 which surrounds and supports a liner or inflation 14 which is connected to a milker claw 16 (shown fragmentarily). The milker claw 16 is connected to a suitable vacuum system (not shown) in the usual manner and has a plurality of nipples 18 (one shown) which project upwardly and outwardly from the claw 16.

The shell 12 is formed from a metal, such as stainless steel, or a transparent material, such as synthetic thermoplastic or thermosetting resign. The shell has a bottom 20 including an opening 22 of reduced diameter and an open upper end terminating in a rim 26.

The inflation 14 is a generally cylindrical, tubular member molded from a flexible or elastomeric material, preferably a synthetic or natural rubber composition including curing agents and the like. The inflation 14 has an elongated, generally cylindrical body portion or suction sleeve 28 which fits inside the shell 12, a head end portion 30 which fits over the upper end of the shell 12 and a reduced claw end portion 32 which extends from the bottom 20 of the shell 12 and is slipped onto a claw nipple 18.

The head end portion 30 of the inflation 14 has a peripheral, downwardly extending cuff 34 which surrounds and fits snugly over the end of the shell 12 and sealingly engages the rim 26 as shown in FIG. 1. An enlarged portion 36 is provided between the suction sleeve 28 and the claw end portion 32. The enlarged portion 36 is squeezed through the bottom opening 22 in the shell 12 by pulling on the claw end portion 32 after the cuff 34 is fitted in place over the shell rim 26. The enlarged portion 36 includes a flange 38 which surrounds the bottom opening 22 and forms a seal with the shell bottom after the claw end portion 32 is released.

Located on the side of the shell 12 is a nipple 39 connected, via suitable tubing (not shown), in communication with the vacuum system which provides a pulsating vacuum in the chamber between the interior wall of the shell 20 and the suction sleeve 28 of the inflation 14 to alternately contract and expand the inflation for milking.

Extending radially inwardly from the outer periphery of the cuff 34 is a relatively thin web section 40 which terminates in a smoothly rounded, raised bead portion 42 defining a circular central opening or mouth 44 for receiving a teat of a cow. The bead portion 42 reinforces the lip of the mouth 44 and assists the mouth 44 in retaining its original circular shape and diameter during use, thereby reducing slippage on the cow's teat and minimizing drop off.

The web section 40 is substantially flat (except for reinforcing ribs to be described) and extends horizontally or perpendicularly to the longitudinal axis 46 of the inflation 14. In order to make the bead-reinforced mouth 44 resilient enough to slip onto teats of different sizes without injury, the wall thickness of the web section 40 preferably is somewhat thinner than the wall thickness of the suction sleeve 28, preferably about 65 to about 95% as thick. As a general guide, the web section 40 can have a wall thickness of about 0.080 to about 0.110 inch. The web section 40 preferably has a uniform wall thickness.

If the web section 40 is deflected and assumes either a concave or convex shape during insertion on a cow's teat and/or during milking, the shape and/or diameter of the mouth 44 can become distorted enough to cause air leakage past the cow's teat and into the inflation. This condition can result in vacuum loss, slurping, inflation slippage or drop off. To avoid this problem, the web section 40 is designed so as to have a tendency to resist deflection from its original flat and horizontal position and, if deflected during insertion of a cow's teat or milking, to return to its original position.

Provided for this purpose is a plurality of circumferentially-spaced ribs 48 which are formed integrally with and extend radially outwardly from the bead 42 and which also are formed integrally with and project axially outwardly from the exterior surface 50 of the web section 40. The ribs 48 add sufficient stiffness to the relatively thin web section 40 to assist in retaining the web section 40 in its original flat and horizontal position and in urging the web section back to that position if deflected. The ribs 48 also assist the bead 42 in retaining its original shape and diameter during use. That is, the ribs 48 assist in minimizing a tendency for the mouth 44 to assume a corrugated shape (with respect to its normal horizontal plane) or to become oblong. For best results, the ribs 48 preferably extend from the bead 42 to point near the outer periphery of the cuff 34.

The ribs 48 preferably are spaced at equal intervals. While a varying number of ribs can be used, twelve are employed in the specific embodiment illustrated. The height and width of the ribs 48 can vary so long as the mouth 44 remains resilient enough to be slipped over teats of different sizes without injury. The height of the ribs 48 preferably are uniform along their length and both the ribs 48 and the bead 42 preferably project the same distance above the exterior surface 50 of the web section 40. As a general guide, the web section 40 can have a thickness of about 0.109 inch with the ribs 48 and the bead 42 projecting 0.016 inch above the exterior surface 50 of the web section 40.

From the foregoing description, one skilled in the art can easily ascertain the essential characteristics of the invention and, without departing from the spirit and scope thereof, make various changes and modifications to adapt it to various usages.

I claim:

1. A milking inflation for a teat cup assembly, said inflation being made from a elastomeric material, having a tubular body and having a head end portion adapted to fit over the upper end of a teat cup shell terminating in a upper rim, said head end portion including
   (a) a peripheral cuff adapted to surround and sealingly engage the upper rim of the shell;
   (b) a substantially flat web section extending radially inwardly from said cuff substantially perpendicularly to the longitudinal axis of the tubular body and terminating in a raised, rounded bead which defines a circular central opening for receiving a teat of a cow; and
   (c) a plurality of circumferentially-extending ribs formed integrally with and spaced radially outwardly from said bead and also formed integrally with and projecting axially outwardly from the exterior surface of said web section.

2. A milking inflation according to claim 1 wherein the wall thickness of said web section is substantially uniform.

3. A milking inflation according to claim 1 wherein said bead and said ribs project substantially the same distance from the exterior surface of said web section.

4. A milking inflation according to claim 1 wherein said ribs extend substantially to the outer periphery of said cuff.

5. A milking inflation according to claim 1 wherein the wall thickness of said web section is about 65 to about 90% of the wall thickness of said body portion.

* * * * *

UNITED STATES PATENT AND TRADEMARK OFFICE
CERTIFICATE OF CORRECTION

PATENT NO. : 4,372,250
DATED : February 8, 1983
INVENTOR(S) : Leigh R. Larson

It is certified that error appears in the above-identified patent and that said Letters Patent are hereby corrected as shown below:

Title page:

In the Abstract, line 8 "circumferentially-extending" should read --- circumferentially-spaced ---.

In the Summary of the Invention, Column 2, line 31, "circumferentially-extending" should read --- circumferentially-spaced ---. In Column 2, line 41 "prevent" should read --- permit ---.

In the Claims, Claim 1, line 51, "circumferentially-extending" should read --- circumferentially-spaced ---.

Signed and Sealed this

Twenty-first Day of March, 1989

Attest:

DONALD J. QUIGG

Attesting Officer

Commissioner of Patents and Trademarks